United States Patent [19]  [11] 3,935,171
Ciaperoni et al.  [45] Jan. 27, 1976

[54] PROCESS FOR THE ANIONIC POLYMERIZATION OF PYRROLIDONE

[75] Inventors: Aldemaro Ciaperoni; Andrea Mattiussi, both of Bollate, Italy

[73] Assignee: Montedison S.p.A., Milan, Italy

[22] Filed: July 22, 1974

[21] Appl. No.: 490,742

[30] Foreign Application Priority Data
July 23, 1973 Italy.................................. 26909/73

[52] U.S. Cl............................................... 260/78 P
[51] Int. Cl.².......................................... C08G 69/24
[58] Field of Search................................... 260/78 P

[56] References Cited

UNITED STATES PATENTS

| | | | |
|---|---|---|---|
| 3,681,294 | 8/1972 | Jarovitsky | 260/78 P |
| 3,721,652 | 3/1973 | Barnes | 260/78 P |
| 3,850,890 | 11/1974 | Ciaperoni | 260/78 P |

Primary Examiner—Lucille M. Phynes

[57] ABSTRACT

Pyrrolidone is anionically polymerized in the presence of alkali pyrrolidonate as catalyst and of carbamates of metals of Groups I and II of the Mendelyeev Periodic System, or of ammonium carbamates, as activators.

5 Claims, No Drawings

PROCESS FOR THE ANIONIC POLYMERIZATION OF PYRROLIDONE

THE PRIOR ART

Various substances are suggested in the patent literature for use as "activators" in the anionic polymerization of pyrrolidone in the presence of alkali pyrrolidonate as catalyst. The suggested activators include, for instance, acyl-lactams, esters of mono- and di-carboxylic acids, isocyanates, unsubstituted and N-substituted amides, N-cyanolactams, urea derivatives, carbon dioxide, trytil derivatives, halosinales, fluorinated olefins, and sulfur dioxide.

One of the disadvantages associated with the use of the prior art activators is that the polypyrrolidones obtained have, in general, low relative viscosity values. Another disadvantage is a low polymerization rate. A still further drawback is that the polypyrrolidones obtained using the prior art activators do not have high thermal stability.

THE PRESENT INVENTION

An object of this invention is to provide a new and improved process for the anionic polymerization of pyrrolidone in the presence of alkali pyrrolidonates as catalyst and of new activators which process does not have the drawbacks and disadvantages of the processes utilizing the known activators.

That and other objects are achieved by the process of this invention, in accordance with which pyrrolidone is polymerized in the presence of the alkali pyrrolidonates as catalysts and of activators which are either ammonium carbamates or carbamates of metals belonging to Groups I to II of the Mendelyeev Periodic System.

We have found that the ammonium carbamates and carbamates of Groups I or Group II metals, when mixed with the alkali pyrrolidonate catalysts (prepared according to known techniques by salification of pyrrolidone with a quaternary ammonium base or with alkali metal hydroxides) function as very effective activators in the polymerisation of pyrrolidone.

The carbamates used as activators in the practice of this invention are of the $NH_2COOMe$ type, in which Me is a metal of Group I or Group II or is the ammonium ion.

The amount of carbamate used can vary within a wide range, for instance from 0.1 to 10 moles per 100 moles of the monomer, but it is preferably from 1 to 4%. The amount of metal hydroxide may vary and may be from 0.5 to 20 moles per mole of the monomer but preferably is from 3 to 10%.

The present process has the following advantages:

1. the polymers obtained have relative viscosity values (measured in $H_2SO_4$ at 20°C and in a concentration of 0.5%) which are, in general, higher than those of polypyrrolidones obtained when the polymerization is carried out by adding activators of the prior art to the alkali pyrrolidonate;

2. the polymerization rate is quite high can be further increased by adding suitable co-activators in very small amounts, without appreciably affecting the thermal stability of the polymers obtained or the spinnability thereof. Useful co-activators are, for instance, acetyl-pyrrolidone, phenyl-isocyanate, toluene-diisocyanate and tetrafluoroethylene The co-activators can be used in amounts of from 0.01 to 0.5% by moles per 100 mols of the monomer; and 3. the polymers obtained with the catalytic system of this invention are much more thermally stable than those obtained with prior art catalytic systems, so much so that they can be spun and formed into fibers having good mechanical charateristics.

The pyrrolidone polymerization according to this invention is carried out at a temperature of from −10° to +100°C, preferably from 20°C to 60°C. It is possible to operate either in bulk or in suspension using inert suspending agents such as petroleum ether, gasoline, kerosene, pentane, hexane, heptane, cyclohexane, octene and other saturated and unsaturated hydrocarbons. The suspension polymerization may be carried out in the presence or absence of emulsifying agents.

The thermal stability and spinnability of the polypyrrolidones produced by the present process were measured using a plastometer according to ASTM D 1237 - 65 T standards and suitably equipped for recording the variations with time of the viscosity of the molten polymer.

The test temperature was fixed at 270°C and the pressure at 12 kg/sq.cm.

The nozzle had a height of 8 mm, and a diameter of 9.5 mm. The length of the capillary tube was 3 mm, its diameter 0.5 mm, and its inlet angle was 40°.

The time which elasped from the introduction of the polymer into the small oven of the plastometer until it attained a viscosity of 500 poises ($t_{500}$) was chosen as the index of the stability of the polymer in the molten state (M.F.I.).

In order that the temperature may be taken as equal to the value imposed on the whole section of the plastometer, the time lapse between introduction of polymer sample into the plastometer oven and the attainment of a viscosity of 500 poises ($t_{500}$) must be from 3.5 to 4 minutes.

The polymers samples of which are characterized by a $t_{500}$ greater than 5–6 minutes are spinnable into fibers. However, in order to insure that the fibers will have good mechanical properties, or that the polymer will have a residence time inside the spinning equipment longer than 2 minutes, it is preferable for the polymer to have $t_{500}$ longer than 8 minutes.

Samples of some of the polymers produced by the present process were spun using a screw extruder having a screw diameter of 17 mm (L/D ratio = 20); a Barney (type ZP 139/A) pump; a glass and corundum ball filter; a spinneret with 21 holes with a length (L) to diameter (D) ratio of the holes equal to 2 (diameter = 0.4 mm).

The winding - up speed was varied from 600 to 800 m/min. The fibers had a total count in deniers of nearly 400. The stretching was carried out at 180°C with a stretching ratio of 1:4.

The following examples are given to illustrate the invention and are not intended to be limiting.

EXAMPLES 1 – 5

Preparation of sodium carbamate ($NH_2COONa$)

In a dry vessel 17 g of metal sodium (0.74 mol) were reacted with 500 ml of methyl alcohol, at a temperature maintained at 0°C. After the sodium had dissolved, gaseous anhydrous ammonia was slowly introduced up to saturation.

Thereupon, keeping the temperature at 0°C, 0.8 mol of anhydrous $CO_2$ was bubbled in under stirring. A white precipitate formed, was filtered in a dry-box, washed several times with anhydrous ether, dried under vacuum at room temperature, and then stored so as to ensure protection from moisture.

The elemental analysis yielded the following results: Calculated C (%) = 14.5; N = 16.9; H = 2.4. found C (%) = 14.6; N = 16.3; H = 2.3.

In a vessel suitably fitted with a stirrer, pipe fittings for nitrogen and vacuum, pyrrolidone and KOH (titer 85%) were reacted in molar proportions (referred to 100 moles of monomer).

The salification reaction between potassium hydroxide and pyrrolidone occurred at 115°– 118°C with release of water and under a residual pressure of 3–5 mmHg.

This reaction was completed within 10 minutes using 400 g of monomer. After having restored the atmospheric pressure inside the vessel by pure nitrogen ($O_2$ 10 ppm), the calculated quantity of sodium carbamate prepared as hereinabove described was introduced into the vessel at 50°C. The sodium carbamate became active at 100°C and under a 3–5 mm Hg vacuum. These conditions were maintained for an established period of time (see Table of examples 1–5), depending on the quantity of carbamate introduced. At the end of this operation, the atmospheric pressure was restored by pure $N_2$ and the mass was polymerized in an oven at 55°C.

After a few hours the polymerization medium became pasty and finally hardened. In order to calculate the polymer yield (C%) and the relative viscosity ($\eta_r$), the polymer was cooled in liquid air, then ground in a mill. The powder thus obtained was washed in water until all of the catalyst had been removed and was then dried for 8 hours in an oven at 100°C.

The following Table I shows how the polymerization rate decreases with decreasing amounts of the components of the catalytic system; the relative viscosity may remain high even when using reduced amounts of carbamate (the amounts of the components of the catalytic system are expressed by moles and referred to 100 moles of monomer).

TABLE I

| Example n. | Monomer g | KOH moles % | Carbamate moles % | Duration hrs. | C% | $\eta_r$ | Reaction time of carbamate |
|---|---|---|---|---|---|---|---|
| 1 | 400 | 7 | 3 | 16 | 22 | 6.7 | 60 minutes |
| 1 bis | 400 | 7 | 3 | 19 | 32 | 7.9 | 60 minutes |
| 2 | 400 | 5 | 1.5 | 21 | 16 | 6.6 | 45 minutes |
| 3 | 400 | 5.8 | 2 | 21 | 34 | 7.1 | 60 minutes |
| 4 | 200 | 3 | 3 | 21 | 18 | 4.6 | 60 minutes |
| 5 | 200 | 2 | 1 | 22 | 19 | 5.9 | 30 minutes |

An M.F.I test (as described above) was performed on a mixture of polymers obtained according to Examples 1, 2 and 3 and having a relative viscosity of 7, in order to calculate $t_{500}$. The value thus determined was 9 minutes and 5 seconds.

In comparison, it was impossible to calculate $t_{500}$ on a portion of polymer obtained from KOH and acetylpyrrolidone inasmuch as the sample was not sufficiently stable under the test conditions.

EXAMPLES 6–7

These examples show how to vary the method of preparation of the catalytic system by adding potassium hydroxide and sodium carbamate to the pyrrolidone at the same time without appreciably changing the quality of the results (yield in polymer, relative viscosity, thermal stability as previously described).

Thus, to 200 g of pyrrolidone contained in a 500 ml flask there were added 4.65 g of potassium hydroxide (titer 85%) and 3.93 g of sodium carbamate. The molar concentrations of potassium hydroxide and of sodium carbamate, referred to 100 moles of pyrrolidone, were 3 and 1.5 respectively.

The temperature of the mass was raised to 100°C; the residual pressure was 3 – 4 mm Hg. These conditions were maintained for 60 minutes. At the end of this time the pressure was restored by $N_2$. Thereafter the colorless and slightly cloudy liquid mass was kept in an oven for 22 hours thermostatically maintained at 55°C. The purification of the polymer was carried out as described in Examples 1–5.

The polymer yield was 27%. The relative viscosity was 5.6. With the molar ratios of KOH and sodium carbamate of 2 and 1 respectively (reaction time at 100°C = 40 minutes; residual pressure = 3–5 mm Hg), after 20 hours the yield was 16%. The relative viscosity was 4.4.

EXAMPLE 8

Preparation of the $NH_2COOK$ potassium carbamate

The synthesis was carried out in an autoclave in the presence of 110 g of finely ground KCl, 4000 g of liquid $NH_3$ and 85 g of $CO_2$ according to the procedures described in German Pat. No. 552,056 of May 19, 1932.

The potassium carbamate thus obtained (155 g; yield 95%) contained about 5% of unreacted KCl and the elemental analysis gave the following results:

calculated C% = 12.1; N = 14.1 and H = 2.1. found C% = 11.3; N = 12.5 and H = 1.9.

Using KOH (titer 85%) 3% molar with respect to the monomer and 1.5% mol of potassium carbamate with respect to the monomer (according to the modalities described in Example 1–5), after 21 hours there was obtained a polymer yield of 20% with a relative viscosity of 6.7.

EXAMPLES 9 – 15

Table II reports the results obtained by effecting the polymerization at 55°C in the presence of KOH, sodium or potassium carbamate and of a co-activator.

From said Table it is apparent that the addition of the co-activator to the catalytic system considerably increases the polymerization rate, while the viscosity remains almost unvaried and the thermal stability is not appreciably varied.

TABLE II

| Example n. | KOH moles % | Carbamate moles % | (Na, K) | Co-activator | moles % | Duration hours | C% | $\eta_r$ | run modalities | M. F. I $t_{500}$ |
|---|---|---|---|---|---|---|---|---|---|---|
| 9  | 3 | 3   | (Na) | Acp *           | 0.05  | 21 | 65 | 5.3 | ex. 1 – 5 | — |
| 10 | 3 | 3   | (Na) | $C_2F_4$        | 0.1   | 17 | 38 | 5.4 | ex. 6 – 8 | 8 min. 44 sec. |
| 11 | 3 | 1.5 | (Na) | Acp             | 0.025 | 21 | 36 | 4.8 | ex. 1 – 5 | 8 min. 47 sec. |
| 12 | 3 | 1.5 | (Na) | Acp             | 0.025 | 22 | 30 | 5.1 | ex. 6 – 8 | 9 min. 10 sec. |
| 13 | 3 | 1.5 | (Na) | Acp             | 0.05  | 21 | 45 | 4.3 | ex. 1 – 5 | 8 min. 16 sec. |
| 14 | 5 | 1   | (K)  | $SiCl_4$        | 0.1   | 5  | 37 | 5.1 | ex. 6 – 8 | |
| 15 | 5 | 1   | (K)  | tdi **          | 0.07  | 5  | 55 | 3.9 | ex. 6 – 8 | |

\* Acp = Acetylpyrrolidone
\*\* tdi = toluene-diisocyanate

EXAMPLES 16 – 20

800 g of pyrrolidone were salified with 74.4 g of KOH of titer 85% (12% molar with respect to the monomer) described in Examples 1 – 5.

After the salification reaction at 115°C in a current of pure $N_2$ and under vigorous stirring, there were introduced 22.0 g of ammonium carbamate (RP C. Erba) (3% molar). When addition of the carbamate was complete, the stirring was carried on in $N_2$ for 30 minutes. Thereafter the mass was left to polymerize for 22 hours at 55°C.

The following results were obtained:
C = 35%; relative viscosity = 10.3;
M.F.I. $t_{500}$ = 10 minutes 40 seconds.

Further examples of runs carried out with ammonium carbamate (CAM) and with potassium hydroxide are reported in Table III (the reaction time of CAM at 115°C was 30 minutes).

TABLE III

| Example n. | KOH moles % | CAM moles % | Duration hrs. | C% | $\eta_r$ | Monomer grams | M. F. I. $t_{500}$ |
|---|---|---|---|---|---|---|---|
| 17 | 12 | 4 | 22 | 29 | 5   | 200 | — |
| 18 | 10 | 2 | 22 | 35 | 6.2 | 400 | 9 min. 26 sec. |
| 19 | 6  | 2 | 22 | 21 | 6.3 | 400 | — |
| 20 | 4  | 1 | 22 | 16 | 4.6 | 200 | 8 min. 10 sec. |

EXAMPLES 21 – 25

Table IV reports the results of the runs carried out at 55°C with CAM, KOH and co-activators which in this case also cause an increase in the polymerization rate.

TABLE IV

| Ex. n. | KOH moles % | CAM moles % | Co-activator | moles % | Duration hrs. | C% | $\eta_r$ | M.F.I $t_{500}$ |
|---|---|---|---|---|---|---|---|---|
| 21 | 5 | 1 | Acp *   | 0.05  | 23 | 49 | 5.5 | — |
| 22 | 4 | 1 | Acp     | 0.025 | 18 | 35 | 4.8 | 9 min. |
| 23 | 4 | 1 | Acp     | 0.05  | 22 | 44 | 3.9 | — |
| 24 | 4 | 1 | $C_2F_4$ | 0.1  | 22 | 37 | 5.1 | — |
| 25 | 5 | 1 | fic **  | 0.1   | 5  | 41 | 3.1 | — |

\* Acp = acetylpyrrolidone
\*\* fix = phenylisocyanate

EXAMPLE 26

Pyrrolidone (255 g), 9.9 g of KOH of titer 85% (5% molar with respect to the monomer), 3.8 g of potassium carbamate (titer 90% - 1% molar) and then 5.1 g of sodium lauryl sulphate were introduced in that order into a 2200 ml steel autoclave equipped with a stirrer. The catalytic system was prepared as in Examples 6 and 7, that is at 100°C and under a vacuum of 3-5 mm Hg for 45 minutes.

After cooling to 55°C, under vigorous stirring, 470 ml of dried heptane and 0.344 ml of $SiCl_4$ (0.1% molar) were added to the reaction mass. The suspension was kept at 55°C under stirring at 400 rev/min. for 5 hours.

At the end of the operation the polymer pellets were separated from the heptane and purified. The polymer had a C content of 6.3% and $\eta_r$ = 2.8.

EXAMPLE 27

The spinning conditions and the characteristics of the fibers obtained from the pyrrolidone polymerized by the catalytic system according to this invention are reported in Table V.

It should be noted that the characteristics of the fibers are similar to the characteristics described for Nylon 4, synthesized in the presence of potassium hydroxide and carbon dioxide, by A. M. Peters & J. A. Gervasi in "Chemtech", January 1972, on page 16 (sample marked A).

Samples obtained with potassium hydroxide and acetylpyrrolidone did not supply any thread because the samples decompose on melting.

TABLE V

| Sample from ex. n. | Spinning temperature (°C) | | | | | $\eta_r$ (0.5% H$_2$SO$_4$ at 20°C) | | | Toughness (g/d) | Elongation at break (%) | Initial elasticity modulus (g/d) |
|---|---|---|---|---|---|---|---|---|---|---|---|
| | zone 1 | zone 2 | zone 3 | pump | spinneret | on the molten | granule | fibre | | | |
| 16 | 285 | 280 | 280 | 270 | 270 | 280 | 10.3 | 1.8 | 5 | 15 | 25 |
| 1 | 275 | 280 | 280 | 270 | 265 | 278 | 6.7 | 1.6 | 5 | 20 | 25 |
| 22 | 275 | 280 | 280 | 270 | 265 | 278 | 4.8 | 1.6 | 4.5 | 30 | 20 |
| A | 286 | 280 | 268 | — | — | — | — | 1.7 – 1.9* | 4.5 | 36 | 19 |

*deduced from $\eta_{inh}$ measured in hexafluoroisopropanol at 25°C in a 0.5% concentration.

We claim:

1. A process for producing a fiber-forming polypyrrolidone by the anionic polymerization of pyrrolidone, which process comprises polymerizing said monomer in contact with a catalytic system composed essentially of an alkali pyrrolidonate as catalyst and, as activator of the catalyst, an alkali metal carbamate or ammonium carbamate.

2. The process of claim 1 in which the amount of carbamate in the catalytic system is from 0.1 to 10 moles, based on 100 moles of monomer.

3. The process of claim 1 in which the amount of carbamate in the catalytic system is from 1 to 4 moles based on 100 moles of monomer.

4. The process of claim 1, in which the catalytic system comprises, in addition to the activator, a co-activator different therefrom.

5. The process of claim 4, in which the amount of co-activator in the catalytic system is from 0.01 to 0.5 mole, based on 100 moles of monomer.

* * * * *

UNITED STATES PATENT OFFICE
CERTIFICATE OF CORRECTION

Patent No. 3,935,171  Dated January 27, 1976

Inventor(s) Aldemaro Ciaperoni et al.

It is certified that error appears in the above-identified patent and that said Letters Patent are hereby corrected as shown below:

Heading, item [75], second line should read

- - - Mattiussi, both of Bollate (Milan) Italy - - -;

not "Mattiussi, both of Bollate, Italy."

Col. 1, line 60,    - - - and - - - should appear between "high" and "can".

Col. 3, line 18,    the symbol - - - $\leq$ - - - should appear before "10 ppm),"

Col. 4, line 40,    "Example" should be - - - Examples - - -.

Signed and Sealed this twelfth Day of July 1977

[SEAL]

Attest:

RUTH C. MASON
*Attesting Officer*

C. MARSHALL DANN
*Commissioner of Patents and Trademarks*